United States Patent
Cecchi et al.

(10) Patent No.: US 11,256,945 B2
(45) Date of Patent: Feb. 22, 2022

(54) AUTOMATIC EXTRACTION OF ATTRIBUTES OF AN OBJECT WITHIN A SET OF DIGITAL IMAGES

(71) Applicant: BULL SAS, Les Clayes sous Bois (FR)

(72) Inventors: Antoine Cecchi, Grenoble (FR); Matthieu Ospici, Grenoble (FR); Pierre Paleo, Grenoble (FR)

( * ) Notice: Subject to any disclaimer, the term of this patent is extended or adjusted under 35 U.S.C. 154(b) by 0 days.

(21) Appl. No.: 16/210,693

(22) Filed: Dec. 5, 2018

(65) Prior Publication Data
US 2019/0171899 A1    Jun. 6, 2019

(30) Foreign Application Priority Data
Dec. 5, 2017    (FR) ...................... 1761632

(51) Int. Cl.
*G06K 9/32*       (2006.01)
*G06N 3/08*       (2006.01)
(Continued)

(52) U.S. Cl.
CPC ....... *G06K 9/3241* (2013.01); *G06K 9/00771* (2013.01); *G06K 9/6217* (2013.01);
(Continued)

(58) Field of Classification Search
CPC ............ G06K 9/3241; G06K 9/00771; G06K 9/6217; G06K 9/6273; G06N 3/08; G06N 5/046
(Continued)

(56) References Cited

U.S. PATENT DOCUMENTS

| 2013/0155229 A1* | 6/2013 | Thornton | H04N 7/18 348/143 |
| 2018/0114063 A1* | 4/2018 | Wexler | G06T 1/0007 |

(Continued)

OTHER PUBLICATIONS

Su, C. et al., "Deep Attributes Driven Multi-camera Person Re-identification," Medical Image Computing and Computer-Assisted Intervention—MICCAI 2015: 18th International Conference, Munich, Germany, Oct. 5-9, 2015; Proceedings; Springer International, CH, CP047356 Sep. 17, 2016, pp. 1-17. (Year: 2016).*

(Continued)

*Primary Examiner* — Yuwen Pan
*Assistant Examiner* — Umair Ahsan
(74) *Attorney, Agent, or Firm* — Meagher Emanuel Laks Goldberg & Liao, LLP

(57) ABSTRACT

The presently disclosed subject matter relates to a method for recognizing objects of a predefined type from among a set of types, within a set of digital images, including
  detecting an object of this predefined type within a digital image of the set, and determining a zone of the image encompassing the detected object,
  generating a signature by a convolutional neural network on the basis of this zone, allowing identification of the object in a one-to-one manner,
  determining on the basis of the signature of a set of attributes,
  storing in a database a record relating to the object associating the signature with the set of attributes,
  wherein the neural network is trained on a learning suite composed of a first set formed of objects associated with a set of attributes and of a second set formed of objects not associated with a set of attributes.

15 Claims, 1 Drawing Sheet

(51) Int. Cl.
G06K 9/62 (2006.01)
G06N 5/04 (2006.01)
G06K 9/00 (2006.01)

(52) U.S. Cl.
CPC ............ *G06K 9/6273* (2013.01); *G06N 3/08* (2013.01); *G06N 5/046* (2013.01)

(58) Field of Classification Search
USPC ........................................................ 382/155
See application file for complete search history.

(56) References Cited

U.S. PATENT DOCUMENTS

2018/0261071 A1* 9/2018 Cao ................. G08B 13/19613
2019/0122064 A1* 4/2019 Ishikawa .............. G06K 9/3241

OTHER PUBLICATIONS

Lin, Y., et al., "Improving Person Re-identification by Attribute and Identity Learning," ArXiv, Apr. 16, 2017,3 KP055491185, downloaded from URL:http://citenpl.internal.epo.org/wf/storage/1647F5F8DB90000DB87/originalPdf,)p. 1-10. (Year: 2017).*

Schumann, A. et al., "Person Re-identification by Deep Learning Attribute—Complementary Information," 2017 IEEE Conference on Computer Vision and Pattern Recognition Workshops (CVPRW), IEEE, Jul. 21, 2017, XP033145928, pp. 1435-1443 (Year: 2017).*

Wen et. al. "A Discriminative Feature Learning Approach for Deep Face Recognition" in European Conference on Computer Vision (ECCV), 2016 (Year: 2016).*

Search Report from French Patent App. No. 1761632 (dated Jul. 20, 2018).

Su, C., et al., "Deep Attributes Driven Multi-camera Person Re-identification," Medical Image Computing and Computer-Assisted Intervention—MICCAI 2015: 18th International Conference, Munich, Germany, Oct. 5-9, 2015; Proceedings; [Lecture Note in Computer Science]. Springer International Publishing, CH, CP047356352, Sep. 17, 2016, pp. 1-17.

Lin, Y., et al., "Improving Person Re-identification by Attribute and Identity Learning," ArXiv, Apr. 16, 2017, XP055491185, downloaded from URL:http://citenpl.internal.epo.org/wf/storage/1647F5F8DB90000DB87/originalPdf, pp. 1-10.

Schumann, A. et al., "Person Re-identification by Deep Learning Attribute—Complementary Information," 2017 IEEE Conference on Computer Vision and Pattern Recognition Workshops (CVPRW), IEEE, Jul. 21, 2017, XP033145928, pp. 1435-1443.

* cited by examiner

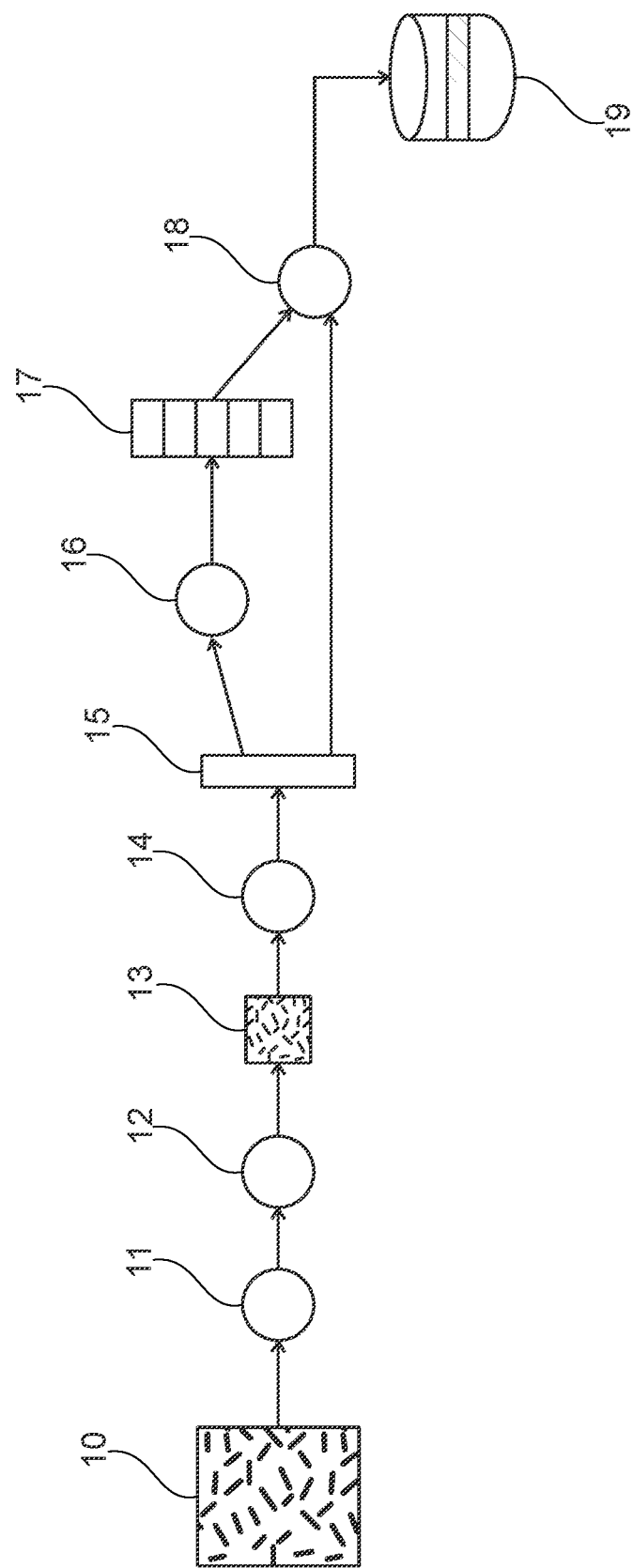

AUTOMATIC EXTRACTION OF ATTRIBUTES OF AN OBJECT WITHIN A SET OF DIGITAL IMAGES

CROSS REFERENCE TO RELATED APPLICATION(S)

This application claims the priority benefit under 35 U.S.C. § 119 of French Patent Application No. 1761632, filed on Dec. 5, 2017, the content of which is hereby incorporated by reference in its entirety.

BACKGROUND

The presently disclosed subject matter relates to the automatic extraction of attributes and the search for objects in a video or a set of digital images. It applies in particular to the tracking of humans in a video stream, for the purpose of video-surveillance, marketing targeting, compiling of statistics, etc.

Video cameras are being increasingly deployed in the public or private space to gather information on the behaviour of human people in a geographical zone.

A typical application is video-surveillance in order to detect, as early as possible, information of interest (for example suspicious behaviours), in zones at risk or to be kept under surveillance (airport, railway station, bank, etc.) or in any other space intended to receive the public, including in the street.

Other applications may relate to commercial or marketing goals in order to track and characterize the behaviour of potential clients in a commercial enclosure (shop, commercial centre, supermarket . . . ).

Video streams form very significant quantities of information, to the point that manual tracking becomes difficult, expensive, or indeed may be impossible in certain situations.

Certain search tools have been devised in recent years but they are based mainly on facial analysis, and not on the complete appearance of a person in low-resolution images.

Thus, existing solutions do not offer sufficient levels of performance.

Furthermore, they are aimed at tracking humans from image to image in a stream of successive images. They do not make it possible to perform searches in a bank of previously gathered images in order to determine whether a given person is situated therein. A fortiori, they do not make it possible to find out, within such a bank of images, whether people corresponding to a set of attributes are situated therein.

SUMMARY

The purpose of the presently disclosed subject matter is to provide a solution which at least partially alleviates the aforementioned drawbacks.

To this end, the presently disclosed subject matter proposes a method for recognizing objects of predefined types in digital images, that includes
  detecting an object of the predefined type within a digital image of the set, and determining a zone of the image encompassing the detected object, generating a signature by a convolutional neural network on the basis of the zone, allowing identification of the object in a one-to-one manner, determining the basis of the signature of attributes, and storing in a database of a record relating to the object associating the signature with the attributes,
  in which the neural network is trained on a learning suite composed of a first set formed of objects associated with attributes and of a second set formed of objects not associated with attributes, According to exemplary embodiments, the presently disclosed subject matter includes one or more of the following characteristics which can be used separately or in partial combination with one another or in total combination with one another: the predefined type is a human; the digital images form a video stream; the convolutional neural network includes a Restnet50 network; the learning suite is a plurality of sub-suites, each determined in a different operational context; the training of the convolutional neural network is supervised by a mechanism involving a "centre loss"; the method also includes a step of searching for objects within the database on the basis of values associated with attributes; the method also includes a step of searching for objects within the database, on the basis of an image containing a single object to be searched for; the record associates the identifier with values representative of values of the attributes for a succession of digital images of the set.

The presently disclosed subject matter also relates to a computer program including program instructions for the execution of a method such as previously defined, when the said program is executed on a computer.

Thus, the presently disclosed subject matter makes it possible to markedly improve the quality of the recognition and detection of objects by specifying their characteristics.

It makes it possible furthermore to deal with additional fields of application with respect to the solutions of the related art.

Notably, by virtue of the association between the people detected and attributes, the solution of the presently disclosed subject matter can make it possible to aim the video-surveillance within an enterprise or on a worksite, for example, so as to detect people not complying with certain safety rules (wearing of a gilet, of a helmet, etc.)

The presently disclosed subject matter also makes it possible to search for and to extract attributes of objects other than human beings, such as notably animals in the case of tracking or of calculation of statistics on a wildlife park or in a rearing operation.

Other characteristics and advantages of the presently disclosed subject matter will become apparent on reading the description which follows of an exemplary embodiment of the presently disclosed subject matter, given by way of example and with reference to the appended drawings.

BRIEF DESCRIPTION OF THE DRAWINGS

FIG. 1 schematically represents an exemplary flowchart illustrating an embodiment of the presently disclosed subject matter.

DETAILED DESCRIPTION OF EXEMPLARY EMBODIMENTS

The presently disclosed subject matter relates to the tracking of objects of a predefined type within a set of digital images.

The objects are typically humans, but other types of objects can be considered without making major modifications to the principles of the presently disclosed subject matter: animals, vehicles, etc.

In a first step, referenced 11, in FIG. 1, a (or several) objects of a predefined type (human, animal, vehicle . . . ) is (or are) detected within a digital image 10. The following step 12 includes determining an encompassing zone for each of the detected objects. It is also possible to detect objects belonging to several types (for example detect humans and vehicles, in the course of one and the same process).

The digital image 10 may be an image originating directly from a video camera or from a bank of images. It may represent a scene in which no, one or more objects may be present.

Furthermore, these objects may be represented in various ways in the digital image: notably, in the case of a human, the latter may be seen from the front, from the back, in profile, standing, seated, in an illuminated zone or in semi-shadow, etc.

The determination of a zone encompassing the object(s) detected can consist of the delimitation of a zone of predetermined type (typically a rectangle) containing the object detected in its entirety and of minimum dimensions, or substantially minimum (provision may be made for margins between the ends of the object at the boundaries of the encompassing zone).

In this way, the presently disclosed subject matter makes it possible to consider all or most sorts of "raw" images, such as arise from a camera and to detect, in an autonomous manner, the presence of an object, and if relevant, to thereafter undertake the tracking of this object, or of these objects when the scene captured by the camera includes several of them.

These steps of detecting, 11, the objects and of determining, 12, the encompassing zones can be performed in various ways. According to the embodiments, these two steps can be performed simultaneously, by one and the same mechanism.

For example, a convolutional neural network is used to simultaneously gradually reduce a zone around an object and, progressively classify the object contained in the zone, in one of the classes searched for (which may simply be the presence or the absence of an object of a predetermined type).

An encompassing set of zones (i.e. reduced to an optimal surface area) and a degree of confidence that it contains an object of the type searched for are in fact obtained by process.

An example of such an approach is described in Liu Wei, Dragomir Anguelov, Dumitru Erhan, Christian Szegedy, Scott Reed, Cheng-Yang Fu and Alexander C. Berg, "*SSD: Single Shot Multibox Detector*", European Conference on Computer Vision (ECCV), Springer International Publishing (2016), pp. 21-37.

The encompassing zones, 13, thus determined can thereafter be used as inputs of the step of generating 14 a signature by a convolutional neural network.

This signature, 15, makes it possible to determine a set of attributes characterizing the detected object, and to also identify the detected object. Stated otherwise, one and the same neural network, via a single prediction phase, makes it possible to determine information of a different nature:
 a signature, which makes it possible to determine whether an object is the same from one image to the other; and
 a set of attributes making it possible to characterize this object.

Proceeding in this way allows performance which is compatible with real time since a single processing may be necessary for the determination of the two types of information, but also, and above all, determination is more precise through the simultaneous use of these two types of information during the convolutional neural network learning (or training) phase.

To allow good learning of the neural network, it is considered to train it with a large number of examples.

Much work exists that has made it possible to compile suites of examples on the basis of real captures arising from video camera, to which attributes have been manually assigned to the objects represented.

The following page presents a certain number of such suites of examples, or "dataset" according to the customary terminology in English:
 http://www.liangzheng.org/Project/project_reid.html According to one embodiment of the presently disclosed subject matter, a composition of a plurality of sub-suites, each determined in a different operational context, that is to say determined by a team of different researchers, having proceeded by an appropriate methodology and in an appropriate environment (location of the camera, targeted population, etc.), is used as learning suite for the neural network.

It is considered that the number of sub-suites is significant so as to allow better representativity of the various images which will thereafter be proposed to the neural network in the prediction phase, and therefore better performance in terms of generalization.

By way of example, the sub-suites used may be:
 CHUK01, such as defined in the article "Human Reidentificaiton with Transferred Metric Learning", by Li Wei, Zhao Rui and Wang Wiaogang, ACCV, 2012;
 CHUK03, such as defined in the article "DeepReID: Deep Filter Pairing Neural Network for Person Re-identification" by Li Wei, Zhao Rui, Xiao Tong and Wang Wiaogang, CVPR, 2014;
 MARS, such as defined in the article "MARS: A Video Benchmark for Large-Scale Person Re-identification", by Zheng Liang, Bie Zhi, Sun Yifan, Wang Jingdong, Su Chi and Wang Shengjin, and Tian Qi, in *European Conference on Computer Vision (ECCV)*, 2016;
 ViPER, such as defined in the article "Viewpoint Invariant Pedestrian Recognition with an Ensemble of Localize Features", by D. Gray, and H. Tao, in *European Conference on Computer Vision (ECCV)*, 2008; and
 Market1501, such as defined in the article "Improving Person Re-identificiation by Attribute and Identity Learning", by Lin Yutian, Zheng Liang, Zhang Zhedong, Wu Yu and Yang Yi, arXiv:1703,07220, 2017.

Each of these "datasets" includes data impacted by the acquisition and creation conditions, although they are aimed at a certain universality. By aggregating and combining these subsets, one minimizes the biases introduced implicitly by the studies which have made it possible to devise them.

Furthermore, according to the presently disclosed subject matter, the neural network is trained on a learning suite composed of a first set formed of objects associated with a set of attributes and of a second set formed of objects not associated with a set of attributes.

Thus, any type of training sub-suites can be taken into account: those which have formed the subject of a manual assignment of attributes can be deposited in the first set, and the others in the second set.

This way of proceeding, termed "multi-task learning", is intrinsically related to the fact that the training of the neural network is performed for a "mixed" signature making it possible, as was seen previously, to identify the detected object and to determine a set of attributes characterizing it.

Hence, the first set will make it possible to enable the signature to represent attributes in addition to being an identifier independent to the orientation of the object, while the second set will make it possible to train the neural network to create a representative signature for an object (identifier), with no impact on the general training of the network relating notably to its ability to extract attributes.

The neural network is typically a convolutional neural network (or "CNN"), which is a well-known technique in the field of the re-identification of an object in a succession of images, as indicated, notably, in the article "*Improving Person Re-identificiation by Attribute and Identity Learning*", by Lin Yutian, Zheng Liang, Zhang Zhedong, Wu Yu and Yang Yi, cited previously.

According to one embodiment of the presently disclosed subject matter, the convolutional neural network may be based on a "RestNet50" network, to which a few layers may be added (layers corresponding to the signature and to the attributes, layers corresponding to the classification, during training).

This "RestNet50" network has been described notably in the article "Deep Residual Learning for Image Recognition", by K. He, X. Zhang, S. Ren and J. Sun, in CVPR, 2016

Stated otherwise, the architecture of the convolutional neural network used to implement the presently disclosed subject matter may be known per se. The innovation resides notably in the mechanisms for training this neural network, and in particular in the fact that the learning suite is composed of a first set formed of objects associated with a set of attributes and of a second set formed of objects not associated with a set of attributes.

Consequently, the neural network makes it possible to generate a signature on the basis of which the attributes will also be extracted.

According to one embodiment of the presently disclosed subject matter, furthermore, the training of the said convolutional neural network is supervised by a mechanism involving a "centre loss". Such a mechanism has been proposed in the article "*A Discriminative Feature Learning Approach for Deep Face Recognition*" by Yandong Wen, Kaipeng Zhang, Zhifeng Li and Yu Qiao, in *European Conference on Computer Vision (ECCV)*, 2016, in a facial recognition framework.

This mechanism aims to provide a signal which, during learning, will favour the grouping together of the recognized characteristics belonging to one and the same class. It thus makes it possible to increase the discriminating character of the classes of characteristics learned.

It has been demonstrated experimentally that it was considered, in the context of the presently disclosed subject matter, to indeed obtain well-discriminated classes as output from the neural network.

More concretely, the "centre loss" learning function tends to congregate a signature obtained by presenting a digital image as input to the neural network, around a "centre" of the corresponding class. This centre (that is to say a vector similar to a signature, corresponding to the output layer of the neural network) thus forms the subject of a learning at the same time as the neural network itself.

During the neural network utilization phase, a new digital image may be presented to it. The neural network's generalizing capabilities then allow the generation of a signature.

This signature corresponds to internal characteristics learned by the neural network (deep characteristics or "deep features").

The determination, 16, of a set of attributes, 17, on the basis of the signature, 15, can be implemented by a classification layer.

The signature can be seen as a vector of values. According to a concrete embodiment of the presently disclosed subject matter, the signature is a vector of 4096 values.

This signature 15 makes it possible to identify an object in a one-to-one manner.

If two distinct digital images represent one and the same object, the neural network can be configured to generate two similar signatures. Conversely, it can be configured to generate two distinct signatures for two different digital images. According to a concrete embodiment put in place, the similarity measurement is made via a calculation of distance between the signatures, an exemplary distance being the cosine measurement.

A set of attributes 17 are extracted from this signature 15.

The attributes may depend on the type of objects that it is sought to identify. In case of human beings, the attributes may include: gender, colours of top garments, colours of bottom garments, length of hair, etc.

More particularly, the values of the signature make it possible to establish a probability for each attribute. Various thresholding mechanisms may be put in place, according to the desired cases of use.

In a step 18, a record relating to the object determined, which associates its signature and its attributes values, is stored in a database 19. Other information may furthermore be stored in this record, such as for example a time-stamp or technical data (identifier of the video camera, etc.)

According to one embodiment of the presently disclosed subject matter, rather than storing values of attributes and of signatures of each digital image, a value representative of the attribute and of the signature is calculated over a succession of digital images. This succession can be defined by a sliding time window of a video sequence. It may for example entail an average value of the values (or probabilities) of the attributes as well as the values of the signatures. The results are thus consolidated by discarding any outlying results.

According to embodiments of the presently disclosed subject matter, the results stored in the database 19 can be utilized by performing searches therein.

These searches may be triggered manually, when a user wishes to search for objects identified or else corresponding to a description, etc.

They can also be triggered automatically, so as to determine various results of statistics, from the comparisons between various sequences of images, etc.

The searches can be performed on the basis of a set of values associated with attributes: it then suffices to determine the set of records whose attribute values correspond to the search criteria for the attributes. It is thus possible to search for all or most of the human beings having garments of a given colour, etc.

The searches may also be performed on the basis of an image containing a single object to be searched for. This image can then form the subject of a processing similar to that described previously so as to determine a signature, via the convolutional neural network. This signature can then be used as search criterion in respect of the database 19.

Of course, the present presently disclosed subject matter is not limited to the examples and embodiment described and represented, but is susceptible to numerous variants accessible to the person skilled in the art.

The invention claimed is:

1. A method for recognizing objects of a set of predefined types within a set of digital images, comprising:
   detecting an object of a predefined type from among the set, within a digital image of the set, and determining a zone of the image encompassing the detected object;

generating a signature by a convolutional neural network on the basis of the zone, allowing identification of the object in a one-to-one manner;

determining, on the basis of the signature, a set of attributes;

storing in a database a record relating to the object, the record associating the signature with the set of attributes and comprising the signature and values defining the set of attributes, at least one of the values being based on a succession of digital images within the set of digital images;

wherein the neural network is trained on a learning suite composed of a first set formed of objects associated with the set of attributes and of a second set formed of objects not associated with the set of attributes.

2. The method according to claim 1, wherein the predefined type comprises a human.

3. The method according to claim 1, in which the digital images form a video stream.

4. The method according to claim 1, in which the convolutional neural network includes a Restnet50 network.

5. The method according to claim 1, in which the learning suite is composed of a plurality of sub-suites, each determined in a different operational context.

6. The method according to claim 1, in which the training of the convolutional neural network is supervised by a mechanism involving a centre loss.

7. The method according to claim 1, furthermore comprising searching for a set of objects within the database on the basis of a set of values associated with attributes.

8. The method according to claim 1, furthermore comprising searching for a set of objects within the database, on the basis of an image containing a single object to be searched for.

9. The method according to claim 1, wherein the record associates an identifier with a set of values which are representative of the values of the attributes for a succession of digital images of the set.

10. A non-transitory computer-readable medium containing instructions which when executed on a processor performs the method of recognizing objects of a set of predefined types within a set of digital images according to claim 1.

11. The method according to claim 1, wherein the at least one value based on a succession of digital images comprises an average value of at least one of the values of the attributes and at least one of the values of the signatures.

12. The method according to claim 1, wherein detecting an object of a predefined type from among the set comprises detecting a plurality of objects from among the set, within a digital image of the set, each object of the plurality of objects having a different type.

13. The method according to claim 1, wherein the determined zone is a zone of the image encompassing the object and a margin of space around the object.

14. The method according to claim 13, wherein the convolutional neural network is configured to simultaneously gradually reduce the zone around the object and, progressively classify the object contained in the zone.

15. The method according to claim 1, wherein which attributes of the object are determined is based on the predefined type of the object.

* * * * *